United States Patent [19]

Burge et al.

[11] 3,993,213

[45] Nov. 23, 1976

[54] THERMALLY INSULATED CRYOGENIC CONTAINER

[75] Inventors: George W. Burge, Long Beach; Richard A. Madsen, Torrance, both of Calif.

[73] Assignee: McDonnell Douglas Corporation, Long Beach, Calif.

[22] Filed: Sept. 4, 1975

[21] Appl. No.: 610,125

[52] U.S. Cl. .................... 220/9 LG; 62/45; 220/9 F
[51] Int. Cl.² ........................... B65D 25/18
[58] Field of Search ............ 220/9 F, 9 LG, 10, 15; 62/45; 114/74 A

[56] References Cited
UNITED STATES PATENTS

| | | | |
|---|---|---|---|
| 2,676,773 | 4/1954 | Sanz et al. | 220/9 LG X |
| 2,859,895 | 11/1958 | Beckwith | 220/9 LG X |
| 2,937,780 | 5/1960 | Beckwith | 220/9 LG |
| 3,018,018 | 1/1962 | Beckwith | 220/9 LG X |
| 3,110,156 | 11/1963 | Niemann | 62/45 |
| 3,389,823 | 6/1968 | Finzi et al. | 220/9 LG |
| 3,411,656 | 11/1968 | Jackson | 114/74 A X |
| 3,489,311 | 1/1970 | Folkerts et al. | 220/9 LG |
| 3,675,809 | 7/1972 | McGrew et al. | 220/9 LG |
| 3,693,367 | 9/1972 | De Peri | 220/Di Peri |
| 3,757,982 | 9/1973 | Isenberg et al. | 220/9 LG X |
| 3,814,275 | 6/1974 | Lemons | 220/9 LG |

*Primary Examiner*—William Price
*Assistant Examiner*—Stephen Marcus
*Attorney, Agent, or Firm*—Max Geldin

[57] ABSTRACT

Thermally insulated container or tank wall construction for cryogenic fluids such as liquid natural gas (LNG) comprising at least two layers of an insulation material, preferably a fiberglass reinforced urethane foam, having an inner liner, preferably in the form of an aluminum foil-fiberglass cloth combination, in contact with the cryogenic fluid, the inner liner being perforated to permit rapid venting, and a thermal stabilizing barrier or liner between the layers of insulation, the stabilizing barrier also preferably being formed of a combination of fiberglass cloth with a layer of aluminum foil to reduce permeability. The two liners are bonded to the individual layers of insulation and the insulation is in turn bonded to the container or tank wall by a suitable adhesive such as a polyurethane adhesive.

In the design of such system, the low permeability thermal stabilization barrier is placed a distance from the cold insulation face adjacent the inner liner equal to or greater than a distance at which boiling will be established adjacent the thermal stabilizing barrier, thereby building up a thin gas layer adjacent to such barrier and preventing liquid from contacting and penetrating the stabilizing barrier.

19 Claims, 6 Drawing Figures

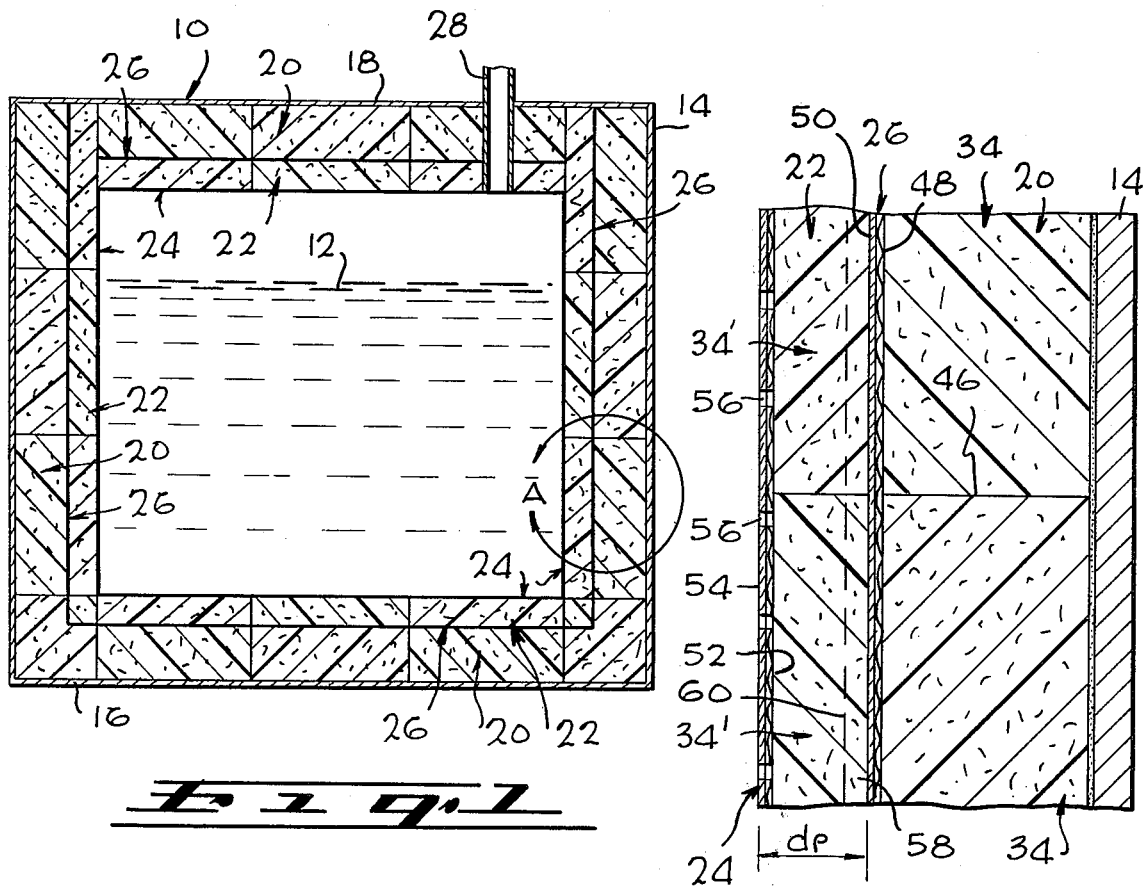
Fig. 1
Fig. 2
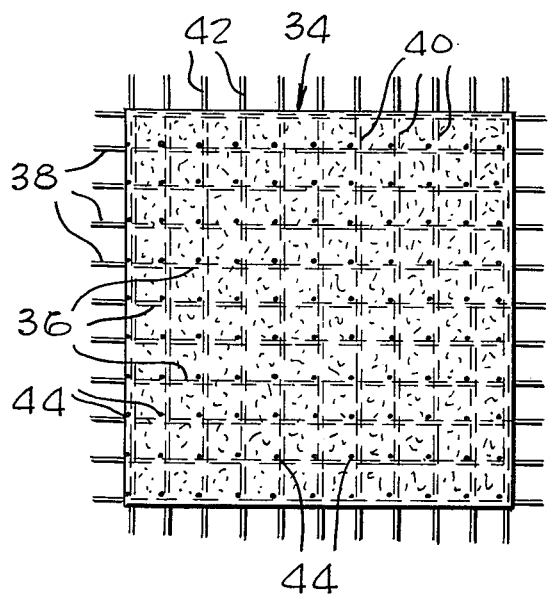
Fig. 4
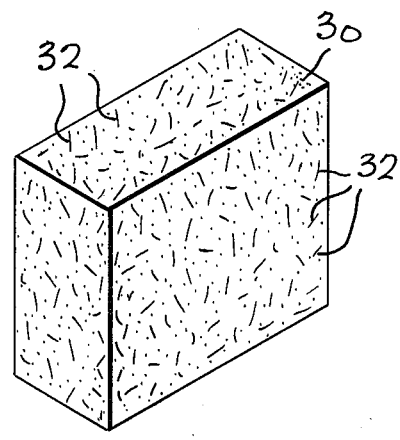
Fig. 3

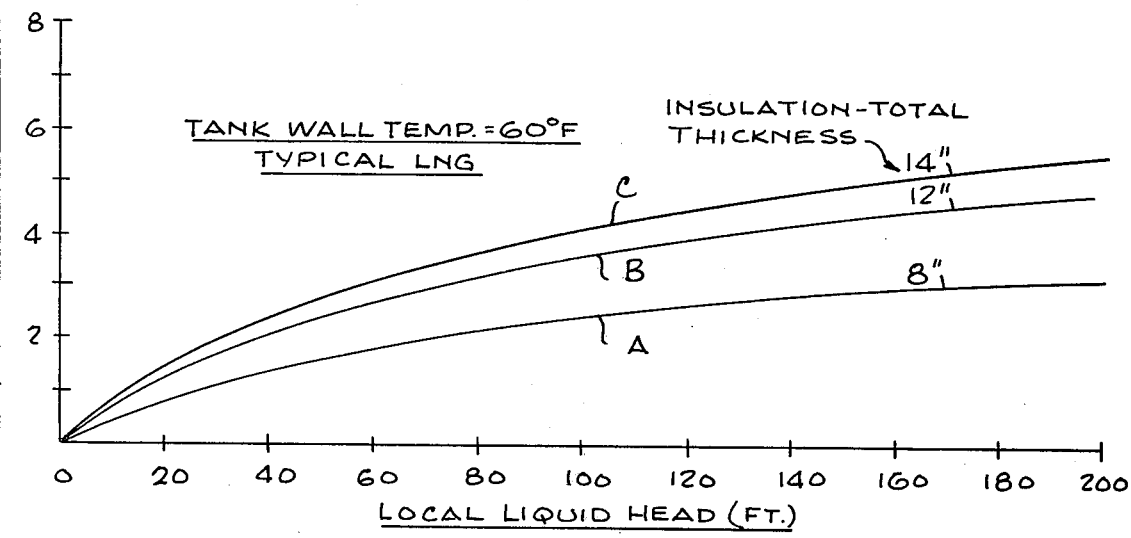
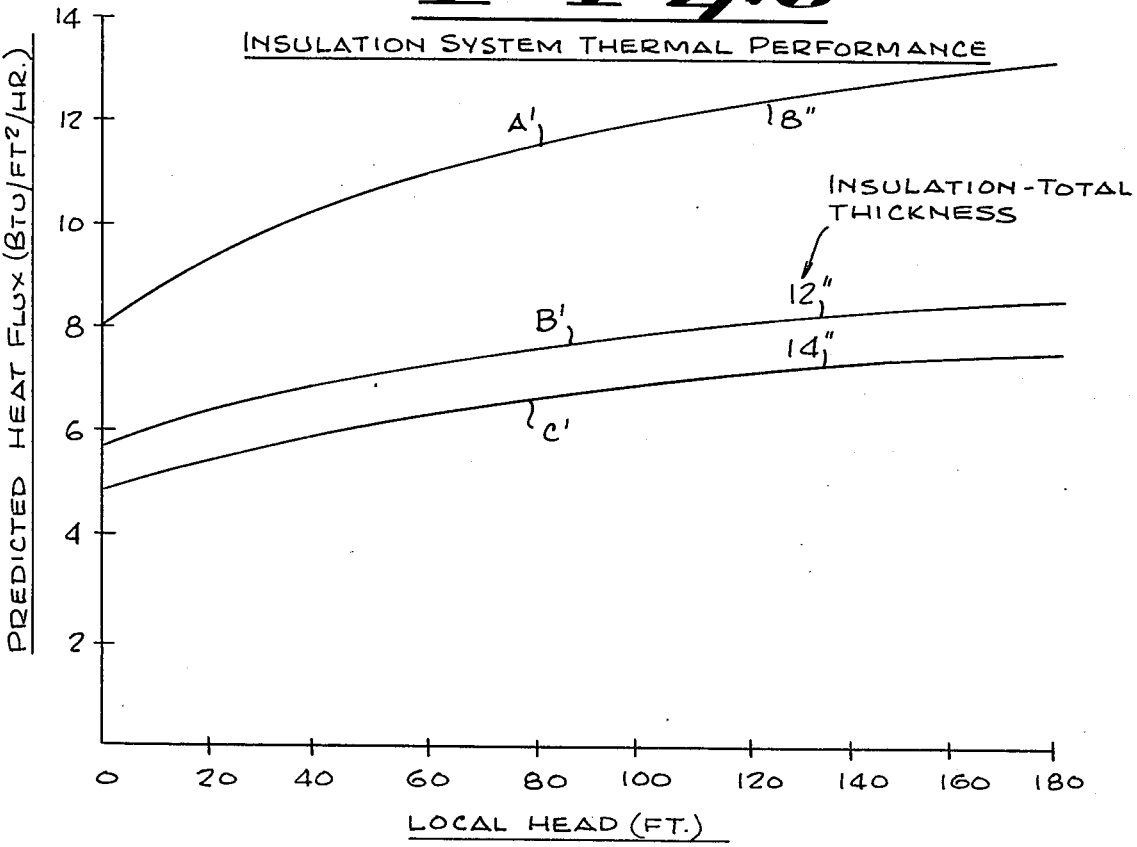

THERMALLY INSULATED CRYOGENIC CONTAINER

BACKGROUND OF THE INVENTION

This invention relates to thermally insulated tanks and containers suitable for the storage of liquefied gases, particularly liquid natural gas (LNG). The invention is particularly concerned with the provision of a cryogenic thermal insulation system of the above type which controls the amount of liquid penetration into the permeable insulation and provides a venting system for gases generated from such penetrating liquid, and avoiding degradation or rupture of the insulation material.

The use of an internal tank wall insulation system for cryogenic liquid storage vessels such as for liquefied natural gas is highly desirable since such a system permits the use of lower cost non-cryogenic tank structural materials, reduces cooldown losses during filling and is easy to maintain. However, the thermodynamic and hydrostatic conditions of stored cryogens permits liquid penetration into permeable insulations. Although the accompanying thermal degradation would be tolerable for some applications, if the penetrating liquid were stable and did not flow, in most instances however, the insulation becomes sufficiently permeable, because of pressure and temperature cycling, that gravity induced circulation is established in each sealed insulation block. Much deeper liquid penetration then occurs, resulting in intolerable thermal degradation, and can even cause the tank wall temperature to drop sufficiently to present structural problems with non-cryogenic structural wall material.

In addition, the conversion of cryogenic liquid such as LNG penetrating the permeable insulation, into large volumes of gas as the liquid warms up and converts to the gaseous state, results in expansion sufficient to tear or rip out pieces of the insulation material during warm-up of the system.

The prior art has employed various concets for thermal insulation of cryogenic containers in an effort to solve the above noted problems resulting from the penetration of cryogenic liquids from the container into the surrounding insulation. Thus, for example, in U.S. Pat. No. 3,411,656 there is disclosed a thermally insulated container for a liquefied gas having an outer wall of substantially fluid impermeable heat insulating material, an intermediate layer of completely fluid permeable material such as open cell flexible polyurethane foam which is provided with a vent to allow escape of gases from the layer, and an inner liner of a material of controlled liquid permeability such as a glass reinforced epoxy resin. However, such system has the disadvantages of requiring external venting directly from the intermediate insulation layer via a complex manifold system, and also requires the use of different types of insulating material including both the fluid impermeable and fluid permeable types.

Cryogenic liquid permeation processes as noted above and illustrated by the above patent can be theoretically eliminated by using a completely impermeable liner between the stored liquid and the insulation. Welded stainless steel liners have been proposed for this purpose. However, such approaches are costly and are of questionable reliability for large, longlife cryogenic systems. Thus, if even a slight liquid leakage occurs with this concept, severe damage to the liner and insulation can result from pressure buildup due to gas expansion within the insulation from evaporation and expansion during warming.

It is an object of the present invention to provide an efficient thermal insulation system for cryogenic containers and tanks. A particular object of the invention is the provision of a relatively simple thermal insulation system of the above type incorporating means which limits the region of flow of liquid cryogen into the thermal insulation layer and wherein a film of vapor is generated at a controlled depth of penetration of the cryogenic liquid, thereby stabilizing the degree of penetration of the cryogenic fluid into the insulation material, and providing optimum thermal performance.

BRIEF DESCRIPTION OF THE INVENTION

The above objects and advantages are achieved according to the invention by controlling the cryogenic liquid penetration depth within the insulation material to a thermally acceptable and stable limit by providing a thin stabilization barrier of low permeability within the insulation, in combination with and spaced from an inner liner adjacent to the insulation cold face, such inner liner preferably being permeable. The stabilization barrier is positioned at a distance from the insulation cold face, which is slightly greater than the penetration depth of a stable liquid film of the cryogenic liquid through the permeable inner liner and into the insulation. Such distance can be calculated and is a function of the specific liquid being stored, the tank liquid head pressure, the warm wall, that is outer wall, temperature, and the permeability of such stabilization barrier.

More specifically, the cryogenic thermal insulation system of the invention comprises at least two layers of an insulation material, preferably a fiber reinforced urethane foam, an inner liquid liner disposed adjacent to the cold cryogenic liquid, and being preferably permeable, permitting passage of cryogenic liquid into the adjacent thermal insulation and permitting rapid venting therefrom, and comprised of a metal foil and fabric backing preferably an aluminum foil and fiberglass cloth combination, which is preferably perforated particularly to accomplish rapid venting, and the above noted thermal stabilizing barrier or liner disposed within the insulation and spaced from the inner liquid liner, such stabilizing barrier comprising a metal foil and fabric backing, and preferably comprising fiberglass cloth and a layer of aluminum foil to reduce permeability. An adhesive such as a polyurethane adhesive is employed to bond the respective liners to the adjacent thermal insulation material, to bond the insulation material to the outer tank wall structure and also to bond the individual layers of insulation material together where a plurality of such insulation layers is employed.

As an important feature of the invention, the low permeability thermal stabilization barrier must be installed within the insulation at a specific distance $d_p$, from the insulation cold face, that is from the interface of the cryogenic liquid in the tank or container with the inner liquid liner. As noted above, such distance is slightly larger than the penetration depth of a stale liquid film of the cryogenic liquid, based on certain parameters including the specific liquid which is being stored and tank head pressure. The stabilization barrier limits the region of gravity induced flow. Liquid flow through the stabilizing barrier is prevented by formation of a thin film of vapor which is generated between the penetrated liquid and the properly located stabilizing barrier, and providing a stable gas layer. Since the barrier position and the resulting thermal performance can be predetermined, the system of the invention is truly an "engineered system" and does not rely substantially on the use of closely controlled insulation or liner materials, as illustrated by the above patent.

The insulation system of the invention is suitable for lining cryogenic storage tanks, ocean tankers, vehicles, rail cars or any other device or facility for the containment or shipping of substantially cryogenic fluids. Although the invention concept is applicable to a variety of cryogens or liquefied gases such as liquefied natural gas (LNG), liquefied hydrogen, liquefied oxygen, liquefied ethylene, liquefied propane and liquefied methane, it has been found particularly applicable to the storing or shipping of LNG especially in large tanks with large static heads and low heat leak requirements (boiloffs) of 0.1 to 1% per day. Noteworthy applications in this respect are LNG ground storage tanks, LNG and LPG (liquefied propane gas) ships, railroad cars, and aircraft tankage.

Although not confined to these materials, particularly effective cryogenic insulation systems according to the invention have been provided employing fiberglass reinforced polyurethane foam insulation, urethane impregnated fiberglass cloth and aluminum foil barriers.

DETAILED DESCRIPTION OF PREFERRED EMBODIMENTS

The invention will be more clearly understood from the description below of certain preferred embodiments, taken in connection with the accompanying drawing wherein:

FIG. 1 is a sectional elevation of a tank for containment of a cryogenic liquid, specifically LNG;

FIG. 2 is a sectional detail taken in the plane indicated by the curved arrow A;

FIG. 3 illustrates one type of fiber reinforced foam insulation material which can be employed;

FIG. 4 illustrates another type of fiber reinforced foam insulation which can be employed;

FIG. 5 is a plot of critical distance of the stabilizing barrier placement ($d_{cr}$) against liquid head in the tank, typical for LNG, for various insulation total thicknesses and based on a specific warm boundary temperature; and FIG. 6 is a plot showing corresponding thermal performance for an optimum stabilization barrier placement as indicated at FIG. 5.

Referring particularly to FIG. 1, there is shown a tank 10 for storage of LNG, indicated at 12, the tank having an outer tank wall 14, a bottom 16 and a top or tank closure 18. The tank can be constructed of any suitable structural material such as mild steel and steel alloys.

Against the tank wall 14, the bottom 16 and top 18 of tank 10 is placed a first layer of an insulation material 20, preferably formed of closed cell polyurethane foam, and a second inner layer of like insulation material 22 is positioned adjacent the first insulation layer 20, completely around the sides, bottom and top of the tank.

Along the inner surface of the inner insulation layer 22 and in contact with the LNG 12 in the tank, is an inner liquid liner 24 comprised of an aluminum foil-fiberglass cloth combination which is perforated, and between the outer insulation layer 20 and the inner insulation layer 22 is a thermal stabilizing barrier or liner 26, preferably formed of the combination of a layer of aluminum foil and fiberglass cloth. The stabilizing barrier 26 is spaced a predetermined distance from the inner surface of the inner liquid liner 24, according to the invention, as described in greater detail below.

The tank 10 is also provided with a vent 28 for venting LNG vapors from within the tank to prevent internal tank pressure buildup.

Referring now to FIG. 2 of the drawing, the thermal insulation system of the invention is provided by adhering the outer layer of insulation material 20 to the inside surface of the outer metal tank walls 14 and the bottom 16 and top 18 of the tank. Various types of permeable insulation material can be employed for this purpose, including closed cell polyurethane foam, closed cell polyvinyl chloride foam and polystyrene foam. The preferred and particularly effective insulation material according to the invention is closed cell polyurethane foam. It is also preferred to incorporate fiber reinforcement in the insulation material, particularly polyurethane foam, for added strength and for prevention of deterioration and gross cracking of the foam particularly as a result of thermal contraction and expansion. Preferably, glass fibers are employed for reinforcement, but other fibers such as polyamide (Nylon), polyester (Dacron), cotton, cellulose, and the like, fibers can be employed.

Referring to FIG. 3, there is illustrated one type of fiber reinforced insulation material which can be employed, comprising blocks of closed cell polyurethane foam 30 having chopped glass fibers 32 dispersed substantially uniformly throughout the polyurethane block.

In FIG. 4 there is illustrated a preferred form of fiber reinforced insulation material comprising blocks of closed cell polyurethane foam 34 having layers of glass fibers 36 embedded in the foam and having exposed fiber ends 38 to facilitate bonding of the reinforced polyurethane blocks 34 to a structural member such as tank wall 14. The polyurethane block 34 has other glass fibers 40 extending vertically, with exposed fiber ends 42 to facilitate bonding of the individual blocks to each other, and layers of other fibers 44 extending horizontally and normal to the fibers 36. This type of reinforcement is known as X, Y, Z, reinforcement, e.g. as shown in Pat. No. 3,322,868, and the resulting reinforced foam is also known as "3D foam."

Again referring to FIG. 2 of the drawing, preferably blocks of the 3D polyurethane foam 34 illustrated in FIG. 4, are bonded together at 46 and to the inner surface of the tank wall 14 by a suitable adhesive, preferably a polyurethane adhesive such as the material marketed as Adiprene L-100.

The stabilizing barrier of aluminum foil and fiberglass cloth combination 26 is then bonded by a suitable adhesive such as polyurethane adhesive to the inner surface of the outer insulation layer 20 formed of the blocks of 3D foam 34. The stabilizing barrier or liner 26 is comprised of the combination of a layer of fiberglass cloth 48 and an aluminum foil 50 in contact with such fiberglass cloth, the fiberglass cloth layer 48 being in contact with the inner face of the outer foam insulation layer 20 formed by the 3D foam blocks 34, and adhered thereto by adhesive as noted above. The aluminum foil 50 disposed on the inner side of the fiberglass cloth 48 has low but not necessarily zero permeability, and is adhered to fiberglass cloth 48 by polyurethane adhesive. The aluminum foil-fiberglass composite functions as a controlled permeability barrier to the passage of cryogenic liquid from the inner insulation layer 22 to the outer insulation layer 20, as described more fully below.

The outer surface of the aluminum foil 50 is in contact with and is bonded to the inner insulation layer 22 by a suitable adhesive such as polyurethane adhesive. The inner insulation layer 22 is also preferably formed of closed cell polyurethane foam, and particularly of fiberglass reinforced 3D foam insulation blocks 34' similar in construction to the foam blocks 34, except that the thickness of the inner insulation layer formed by the 3D foam blocks 34' generally is not as thick as the outer insulation layer 20 formed of the foam blocks 34, and is determined by "worst case" operating conditions.

On the inner surface of the insulation layer 22 is positioned the inner liquid liner 24, such liner being comprised of a fiberglass cloth 52 in contact with the inner insulation layer 22 and an aluminum foil 54 in contact with the opposite surface of the fiberglass cloth 52 and disposed in contact with the LNG 12 within the tank. The aluminum foil 54 and the fiberglass cloth 52 are perforated with small aligned holes 56 of a size, e.g. ranging from about 0.06 inch to about 0.1 inch, to provide a porous and ventilated inner liquid liner 24.

The aluminum foils 54 and 50 of the inner liquid liner 24 and the stabilizing barrier 26, in addition to aiding and controlling the permeability of such liner and barrier, also aid in providing fire protection for the insulation system. In place of aluminum foils, other metal foils can be employed such as steel, nickel-steel alloys, and the like. Such metal, e.g. aluminum, foils can vary in thickness, but such thickness generally ranges from about .001 inch to about .003 inch. Further, although fiberglass cloth is preferred in combination with aluminum foil in providing the inner liner and stabilizing barrier or liner 24 and 26, other cloth reinforcements can be used such as polyamide, polyester and cellulose fabrics.

In preferred practice the fiberglass cloths 48 and 52, or other equivalent fabrics, are resin impregnated, the preferred fiberglass cloth being impregnated with polyurethane resin and bonded to the adjacent aluminum foils 50 and 54, with a polyurethane adhesive.

As previously noted, the essential feature in the design of the insulation system of the present invention is the distance that the stabilizing barrier 26 is placed from the cold insulation face at the inner surface of the aluminum foil 54 of the inner liquid liner 24. As the insulation of the inner foam insulation layer 22 is loosened by thermal cycling, thermodynamic and fluid dynamic forces will cause the stored cryogenic liquid to pass through the perforated liquid liner 24 and penetrate into such inner insulation layer, and gravity induced internal flow of the cryogenic liquid therein will be initiated. If the placement of such stabilizing barrier or liner 26 from the cold insulation face is at a distance, $d_p$, equal to or greater than a certain critical distance, $d_{cr}$, boiling of the cryogenic liquid will be established in the inner insulation 22 adjacent the inner surface of the stabilizing barrier 26, and a thin cryogenic stable gas layer 58 will be built up in the inner insulation layer 22 adjacent the inner surface of the barrier 26, e.g. between the dotted line indicated at 60 and the inner surface of the stabilizing barrier 26. This boiling will maintain the barrier 26 slightly above the liquid saturation temperature and will prevent liquid from contacting and thereby penetrating the stabilizing barrier 26.

The critical distance, $d_{cr}$, is governed by basic thermodynamic equilibrium and as previously noted, is dependent upon factors including the particular cryogenic liquid being stored, the local tank fluid head, the warm boundary temperature, that is, the temperature of the outer wall of the container, and the permeability of the stabilizing barrier. FIG. 5 shows the value of $d_{cr}$ typical for LNG for varying liquid heads, assuming a warm boundary or tank wall temperature of 60° F and total insulation thicknesses of 8, 12 and 14 inches, as represented by curves A, B and C, respectively. The critical stabilizing barrier placement location is caclulated by first determining the saturation temperature of the LNG composition at its specific head pressure through a phase equilibria computation or from test data and then solving for the location of this saturation temperature point within the insulation by solving the conventional steady-state conduction heat transfer equation through a two-slab insulation where the inner slab has a thermal conductivity equal to that of the liquid cryogen and the outer has a thermal conductivity equal to that of gas filled insulation.

The corresponding thermal performance for an optimum stabilizing barrier placement as indicated by curves A, B and C in FIG. 5, is shown at A', B' and C', respectively, in FIG. 6. These heat transmission values follow directly from the above analysis for the determination of the stabilizing barrier placement. If the stabilizing barrier 26 is placed at a distance $d_p$ greater than $d_{cr}$, the behavior of these systems will still be stable and predictable, but the thermal performance will be less than optimum since the liquid will penetrate further into the insulation layer 22 approaching the secondary barrier 26. If $d_p$ is less than $d_{cr}$, a vapor film will not be formed, and the system will be unstable. In the latter case, liquid will penetrate the stabilizing barrier 26 even though the latter has reduced permeability, and the thermal performance will be locally high and unsatisfactory. It is noted that $d_{cr}$ is a function of fluid head pressure, increasing as the head is increased. Thus, for optimum performance, $d_p$ should be increased going down the tank wall, that is, at increasing depths of liquid in the tank. If a constant $d_p$ is employed as a practical alternative, it should be based on the maximum head condition, that is at the tank bottom, to assure complete system stability.

In normal operation of the insulation system of the invention, no cryogenic liquid should exist between the tank wall and the stabilizing barrier 26. The stabilizing barrier 26 aids in stabilizing the degree of liquid penetration into the inner insulation layer 22 and to stagnate the liquid therein so that the temperature at the stabilizing barrier is at or above the saturation temperature of the liquid, and thereby forming the adjacent vapor layer 58. The inner foam insulation layer 22 is sufficiently loose and permeable to permit free flow of cryogenic liquid and gas into and out of such foam layer via the perforated inner liner 24. This ability of the invention system to rapidly vent gas and/or liquid from the system prevents liner and foam damage during system warm-up.

Although in preferred practice, the stabilizing barrier is comprised of a combination of a metal foil such as aluminum and a fabric such as fiberglass to afford low permeability, it has been found that in the stabilizing barrier 26, the aluminum foil 50 can be omitted, and the fabric layer, that is fiberglass cloth 48, preferably impregnated with resin and adhesively bonded to both the outer insulation layer 20 and inner insulation layer 22, generally is of sufficiently low permeability to function as the stabilizing barrier in the absence of the metal or aluminum foil 50.

Further, although in preferred practice, the inner liquid liner 24 is made porous or permeable as noted above, the invention principles can also be used in conjunction with a completely impermeable inner liquid liner between the stored cryogen and the inner insulation layer 22. In this case, the stabilization barrier of the present invention would serve to control and minimize liquid penetration into the insulation if and when the impermeable inner liner should fail as a result of mechanical damage.

The invention concept was demonstrated and verified by a series of heated plate/LNG dewar tests in which a 3D polyurethane foam insulation specimen having a total thickness of 4 inches was subjected on one side to 60° F by means of an electrically heated copper plate (simulating the tank metal wall) and on the other side to −260° F by contact with LNG. Moreover, the LNG was pressurized and subcooled to simulate worst conditions at the bottom of a 123-foot tank. The specimen was first constructed with no stabilizing barrier in the 4-inch thick insulation system and was subjected to thermal cycles. At first the liquid penetration stabilized at its natural depth into the insulation (about 1 inch) yielding heat flux values of 21 to 26 BTU/ft$^2$hr. But by the 19th thermal cycle instability of the liquid penetration occurred with local heat flux values as high as 107 BTU/ft$_2$hr and local liquid penetration of over 2 inches.

The specimen using the same foam and instrumentation was rebuilt incorporating an internal stabilizing barrier of fiberglass cloth and aluminum foil. In one test the stabilizing barrier was optimally located according to FIG. 5 about 1.2 inches from the surface in contact with the LNG, and in another test the stabilizing barrier was located non-optimally and deeper in the system, that is, 1.75 inches, from the surface in contact with the LNG. Twenty-five additional LNG thermal cycles were then run under identical conditions to the previous testing for each of the two stabilizing barrier locations noted above, respectively. The liquid penetration was found to be stabilized just ahead of the stabilizing barrier in both cases, with very consistent heat flux values of 23 BTU/ft$^2$hr. and 25.7 BTU/ft$^2$hr for the optimum and non-optimum cases, respectively. Additional tests were also run on a similar but larger specimen with a total insulation thickness of 12 inches as opposed to 4 for the previous specimen. Performance was identical except that the heat fluxes were lower, that is 6 to 7 BTU/ft$^2$hr., because of the thicker insulation.

The insulation system of the invention and particularly designed for containment and shipment of cryogenic liquids such as LNG has the following features and advantages: provides an engineered internal or "wet wall" insulation system with acceptable, reliable and predictable thermal performance; eliminates the need for costly impermeable primary insulation liquid barriers in direct contact with the cryogenic liquid, which are prone to damage, and substitutes for such impermeable barrier a porous inner liquid liner; eliminates the need for using expensive and closely controlled foam insulation with ultra-low permeability; provides an insulation system wherein the real liquid barrier is located within the insulation and is therefore less susceptible to damage during operational use and servicing; permits the use of porous or ventilated liquid insulation barriers or liners so that high internal foam pressure buildup during system warmup, which usually causes severe insulation damage, can be eliminated; and provides an insulation system with a ventilated liner which eases gas-freeing of the insulation, thus reducing the possibility of trapping hazardous fluids.

The above features and advantages are achieved by the above described insulation concept employing an internal stabilizing barrier of reduced permeability within the permeable foam insulation in conjunction with a preferably porous liner or barrier at the inner surface of the foam insulation and in contact with the cryogenic liquid, the liquid stabilizing barrier being placed at a predetermined distance from the cold surface or inner surface of the insulation such as to generate a stable film of cryogenic vapor in the foam insulation adjacent the inner surface of the stabilizing barrier, essentially preventing passage of liquid cryogen into the foam insulation between the stabilizing barrier and the outer tank wall, while permitting easy ventilation of generated vapors or gas from the vapor zone back out through the porous inner liquid liner.

The invention concept is applicable to a variety of cryogens, and insulation and barrier materials, as described above.

Since various changes and modifications of the invention will occur to and can be made readily by those skilled in the art without departing from the invention concept, the invention is not to be taken as limited except by the scope of the appended claims.

What is claimed is:

1. A thermally insulated container for low-temperature or cryogenic fluids, including liquid natural gas, which comprises an outer container having an outer wall, at least two layers of insulation material supported within said container, including an outer insulation layer and an inner insulation layer, an inner liquid liner disposed adjacent said inner layer, said liner being in contact with said low-temperature fluid, said inner insulation material being fluid permeable, and a stabilizing barrier of low fluid permeability disposed between said at least two layers of insulation material, said outer stabilizing barrier being positioned at a predetermined distance from the cold face of said inner liner, such that boiling of fluid permeating said inner insulation layer occurs therein adjacent said stabilizing barrier and forming a stable gas layer in said inner insulation layer adjacent said stabilizing barrier, thereby substantially preventing low-temperature liquid from contacting and penetrating said barrier, said predetermined distance being slightly larger than the penetration depth of a stable liquid film of said cryogenic fluid through said inner liner and into said inner insulation layer, said predetermined distance of said stabilizing barrier from the cold face of said inner liner being dependent upon the type of said low-temperature or cryogenic fluid, the head of said fluid in said container, the temperature of the outer wall of said container and the permeability of said stabilizing barrier.

2. A thermally insulated container as defined in claim 1, no cryogenic liquid existing between the outer container and said stabilizing barrier, the temperature at said stabilizing barrier being at or above the saturation temperature of the cryogenic liquid, and thereby forming said stable gas layer adjacent said barrier.

3. A thermally insulated container as defined in claim 1, said inner liquid liner being permeable to said low temperature or cryogenic fluids.

4. A thermally insulated container as defined in claim 3, wherein said at least two insulation layers are foam layers, said inner liner is comprised of a metal foil and a fabric backing, said metal foil being in contact with said low-temperature fluid in said container, and said inner liner being perforated to permit rapid venting, and said stabilizing barrier is comprised of a fabric layer, said last mentioned fabric layer being bonded to said at least two layers of insulation.

5. A thermally insulated container as defined in claim 4, wherein said fabric backing of said inner liner and said fabric layer of said stabilizing barrier are polyurethane impregnated fiberglass cloth.

6. A thermally insulated container as defined in claim 3, wherein said at least two insulation layers are foam layers, said inner liner is comprised of a metal foil and a fabric backing, said metal foil being in contact with said low-temperature fluid in said container, and said inner liner being perforated to permit rapid venting, and said stabilizing barrier is comprised of a metal foil and a fabric backing.

7. A thermally insulated container as defined in claim 6, wherein said foam layers are fiber reinforced.

8. A thermally insulated container as defined in claim 6, wherein said fabric backings of said inner liner and said stabilizing barrier are resin impregnated fabric backings.

9. A thermally insulated container as defined in claim 6, wherein said inner liner is adhesively bonded to said inner insulation layer and said stabilizing barrier is adhesively bonded to said outer insulation layer.

10. A thermally insulated container as defined in claim 6, wherein said inner liner is comprised of an aluminum foil and a fiberglass cloth backing, said liner being perforated with a plurality of holes, and said stabilizing barrier is comprised of aluminum foil and a fiberglass cloth backing.

11. A thermally insulated container as defined in claim 10, wherein said at least two insulated layers are polyurethane foam layers.

12. A thermally insulated container as defined in claim 11, wherein said polyurethane foam layers are reinforced with glass fibers.

13. A thermally insulated container as defined in claim 12, wherein said reinforced polyurethane foam layers are 3D foam containing oriented glass fibers including X, Y and Z oriented fibers.

14. A thermally insulated container as defined in claim 13, wherein said fiberglass cloth backings of said inner liner and said stabilizing barrier are impregnated with polyurethane resin.

15. A thermally insulated container as defined in claim 14, wherein said perforated aluminum foil-polyurethane impregnated fiberglass cloth backing inner liner is bonded to said inner insulation layer by polyurethane adhesive and said aluminum foil-polyurethane impregnated fiberglass cloth backing stabilizing barrier is bonded to said outer insulation layer by polyurethane adhesive, and said outer insulation layer is bonded to the inner surface of said container by polyurethane adhesive.

16. An improved thermally insulated container for low-temperature or cryogenic fluids, including liquid natural gas, which comprises an outer container having an outer wall, a first outer insulation layer of closed cell polyurethane foam supported on the inside surface of said outer container, a second inner insulation layer of closed cell polyurethane foam peripherally disposed adjacent to and around the inner surface of said first insulation layer, an inner liquid liner positioned around and in contact with said second inner insulation layer, said inner liner comprised of a combination of a fiberglass cloth and aluminum foil, said aluminum foil being in contact with said low-temperature fluid in said container and said fiberglass cloth being in contact with said inner insulation layer, said inner liner being perforated with a plurality of holes, rendering said inner liner fluid permeable, and a stabilizing barrier positioned between and in contact with said outer and inner insulation layers, said stabilizing barrier comprised of a combination of aluminum foil and fiberglass cloth, said stabilizing barrier having reduced permeability, said last mentioned aluminum foil being in contact with said inner insulation material and said last mentioned fiberglass cloth being in contact with said outer insulation material, said stabilizing barrier being positioned at a predetermined distance from the inner surface of the aluminum foil of said inner liner such that boiling of fluid permeating said inner insulation layer occurs therein adjacent said aluminum foil of said stabilizing barrier and forming a stable gas layer in said inner insulation layer adjacent said aluminum foil of said stabilizing barrier, thereby essentially preventing low-temperature liquid from contacting and penetrating said stabilizing barrier, said predetermined distance being slightly larger than the penetration depth of a stable liquid film of said cryogenic fluid through said inner liner and into said inner insulation layer, said predetermined distance of said stabilizing barrier from the cold face of said inner liner being dependent upon the type of said low-temperature or cryogenic fluid, the head of said fluid in said container, the temperature of the outer wall of said outer container and the permeability of said stabilizing barrier.

17. A thermally insulated container as defined in claim 16, wherein said polyurethane foam inner and outer insulation layers are each comprised of blocks of glass fiber reinforced urethane foam, said fibers comprising layers of oriented X, Y and Z fibers.

18. A thermally insulated container as defined in claim 17, wherein said fiberglass cloth of said inner liner and of said stabilizing barrier is impregnated with polyurethane resin.

19. A thermally insulated container as defined in claim 18, wherein said fiberglass cloth of said inner liner is bonded to said inner insulation layer by polyurethane adhesive, said fiberglass cloth of said stabilizing barrier is bonded to said outer insulation layer by polyurethane adhesive, and said blocks of glass fiber reinforced polyurethane foam forming the respective insulation layers are bonded together by polyurethane adhesive and said outer insulation layer is bonded to the inner surface of said container by polyurethane adhesive.

* * * * *